(12) United States Patent
Aronoff et al.

(10) Patent No.: US 7,461,103 B2
(45) Date of Patent: *Dec. 2, 2008

(54) SYSTEM AND METHOD FOR RECONCILING TRANSACTIONS BETWEEN A REPLICATION SYSTEM AND A RECOVERED DATABASE

(75) Inventors: Eyal M. Aronoff, Irvine, CA (US); James W. Collings, Tustin, CA (US)

(73) Assignee: Quest Software, Inc., Aliso Viejo, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 11/439,073

(22) Filed: May 23, 2006

(65) Prior Publication Data

US 2006/0212493 A1    Sep. 21, 2006

Related U.S. Application Data

(63) Continuation of application No. 09/782,586, filed on Feb. 12, 2001, now Pat. No. 7,065,538.

(60) Provisional application No. 60/182,073, filed on Feb. 11, 2000.

(51) Int. Cl.
*G06F 7/00* (2006.01)
*G06F 12/00* (2006.01)
*G06F 17/30* (2006.01)

(52) U.S. Cl. ............... 707/204; 707/2; 707/8; 707/202; 707/203; 707/204

(58) Field of Classification Search ....... 707/2, 707/8, 202, 203, 204
See application file for complete search history.

(56) References Cited

U.S. PATENT DOCUMENTS 4,130,867 A    12/1978    Bachman et al.
4,648,031 A *  3/1987    Jenner .................. 714/10
4,665,520 A    5/1987    Strom et al.
5,222,235 A    6/1993    Hintz et al.
5,297,279 A    3/1994    Bannon et al.
5,325,505 A    6/1994    Hoffecker et al.
5,333,314 A    7/1994    Masai et al.
5,422,979 A    6/1995    Eichfeld et al.
5,423,037 A *  6/1995    Hvasshovd ............ 707/202
5,455,945 A    10/1995   VanderDrift
5,530,855 A *  6/1996    Satoh et al. ........... 707/201
5,551,020 A    8/1996    Flax et al.

(Continued)

OTHER PUBLICATIONS

"Quest SharePlex for Oracle," Brochure, Quest Software, Inc., Nov. 1999, 4 pages.

(Continued)

*Primary Examiner*—Etienne P LeRoux
*Assistant Examiner*—Jorge A Casanova
(74) *Attorney, Agent, or Firm*—Knobbe, Martens, Olson & Bear, LLP

(57) ABSTRACT

The invention is a reconcile system for providing data replication between a source system and a target system. The reconcile system includes a reconcile process that determines a recovery position for a failed or otherwise desynchronized target system, and purges queues of the reconcile system of stale transactions occurring before the recovery position, thereby ensuring synchronization between the source and target systems.

20 Claims, 3 Drawing Sheets

U.S. PATENT DOCUMENTS

| | | | |
|---|---|---|---|
| 5,553,303 A | 9/1996 | Hayashi et al. | |
| 5,596,747 A | 1/1997 | Katabami et al. | |
| 5,634,052 A | 5/1997 | Morris | |
| 5,640,561 A | 6/1997 | Satoh et al. | |
| 5,655,081 A | 8/1997 | Bonnell et al. | |
| 5,721,915 A | 2/1998 | Sockut et al. | |
| 5,758,356 A | 5/1998 | Hara et al. | |
| 5,761,677 A | 6/1998 | Senator et al. | |
| 5,774,717 A | 6/1998 | Porcaro | |
| 5,778,377 A | 7/1998 | Marlin et al. | |
| 5,778,392 A | 7/1998 | Stockman et al. | |
| 5,796,934 A | 8/1998 | Bhanot et al. | |
| 5,799,322 A | 8/1998 | Mosher, Jr. | |
| 5,822,780 A | 10/1998 | Schutzman | |
| 5,848,416 A | 12/1998 | Tikkanen | |
| 5,893,924 A | 4/1999 | Vakkalagadda | |
| 5,933,818 A | 8/1999 | Kasravi et al. | |
| 5,933,820 A | 8/1999 | Beier et al. | |
| 5,940,832 A | 8/1999 | Hamada et al. | |
| 5,943,677 A | 8/1999 | Hicks | |
| 5,948,108 A | 9/1999 | Lu et al. | |
| 5,951,694 A | 9/1999 | Choquier et al. | |
| 5,951,695 A | 9/1999 | Kolovson | |
| 5,956,489 A | 9/1999 | San Andres et al. | |
| 5,956,504 A | 9/1999 | Jagadish et al. | |
| 5,978,594 A | 11/1999 | Bonnell et al. | |
| 5,983,239 A | 11/1999 | Cannon | |
| 5,991,761 A | 11/1999 | Mahoney et al. | |
| 5,995,958 A | 11/1999 | Xu | |
| 6,003,022 A | 12/1999 | Eberhard et al. | |
| 6,016,497 A | 1/2000 | Suver | |
| 6,026,412 A | 2/2000 | Sockut et al. | |
| 6,029,195 A | 2/2000 | Herz | |
| 6,067,545 A | 5/2000 | Wolff | |
| 6,070,170 A | 5/2000 | Friske et al. | |
| 6,119,128 A | 9/2000 | Courter et al. | |
| 6,122,640 A | 9/2000 | Pereira | |
| 6,151,607 A | 11/2000 | Lomet | |
| 6,157,932 A | 12/2000 | Klein et al. | |
| 6,185,699 B1 * | 2/2001 | Haderle et al. | 714/19 |
| 6,243,715 B1 | 6/2001 | Bogantz et al. | |
| 6,253,212 B1 | 6/2001 | Loaiza et al. | |
| 6,289,357 B1 | 9/2001 | Parker | |
| 6,343,296 B1 | 1/2002 | Lakhamraju et al. | |
| 6,363,387 B1 | 3/2002 | Ponnekanti et al. | |
| 6,411,964 B1 | 6/2002 | Iyer et al. | |
| 6,460,048 B1 | 10/2002 | Teng et al. | |
| 6,470,344 B1 | 10/2002 | Kothuri et al. | |
| 6,477,535 B1 | 11/2002 | Mirzadeh | |
| 6,499,039 B1 | 12/2002 | Venkatesh et al. | |
| 6,519,613 B1 | 2/2003 | Friske et al. | |
| 6,523,035 B1 | 2/2003 | Fleming et al. | |
| 6,584,474 B1 | 6/2003 | Pereira | |
| 6,606,626 B1 | 8/2003 | Ponnekanti | |
| 6,631,478 B1 | 10/2003 | Wang et al. | |
| 6,671,721 B1 * | 12/2003 | Branson et al. | 709/224 |
| 6,691,139 B2 | 2/2004 | Ganesh et al. | |
| 6,721,742 B1 | 4/2004 | Uceda-Sosa et al. | |
| 6,728,780 B1 | 4/2004 | Hebert | |
| 6,834,290 B1 | 12/2004 | Pugh et al. | |
| 6,950,834 B2 | 9/2005 | Huras et al. | |
| 7,065,538 B2 | 6/2006 | Aronoff et al. | |
| 2006/0212496 A1 | 9/2006 | Romine et al. | |

OTHER PUBLICATIONS

Computer Associates, "Platinum Tsreorg Automates Tablespace Reorganization, Customer Story," http://platinum.com/products/custor/tsreorg.htm, 2 pages downloaded and printed from the World Wide Web on Nov. 30, 1999.

Computer Associates, "Platinum OnlineReorg Technical Overview, OnlineReorg," http://platinum.com/products/dba/onreo_to.htm, 5 pages downloaded and printed from the World Wide Web on Nov. 30, 1999.

Computer Associates, "ProVision TSreorg for Oracle," http://platinum.com/products/brochure/provis/pv_dr.htm, 4 pages downloaded from the World Wide Web on Nov. 30, 1999.

Computer Associates, "Rapid Reorg for DB2 for OS-390, Brochure," http://platinum.com/products/brochure/dm/b_rrd.htm, 3 pages downloaded from the World Wide Web on Nov. 30, 1999.

"Space Management and Reorganization: Challenges and Solutions," http://www.quest.com/whitepapers/space_managerwp.doc, published on or around Dec. 21, 1999.

"Top Five Tips for Space Management and Reorganization," Brochure, Quest Software, Inc., Nov. 1999, 4 pages.

Joseph Pagano, Microsoft Exchange Server, 1996.

* cited by examiner

| USER ACTIVITY ON SOURCE SYSTEM | | TRANSACTION PROGRESS | | |
|---|---|---|---|---|
| START (SET TRANS.) | COMPLETE (COMMIT TRANS.) | TRANSACTIONS IN LOG FILES OF THE SOURCE SYSTEM | TRANSACTIONS IN READER QUEUE | TRANSACTIONS IN POSTER QUEUE | APPLY TO TARGET SYSTEM? |
| T01 | | T01 Set Transaction | T01 Set Transaction | T01 Queue Transaction | Wait for Commit |
| T02 | | T02 Set Transaction | T02 Set Transaction | T02 Queue Transaction | Wait for Commit |
| T03 | | T03 Set Transaction | T03 Set Transaction | T03 Queue Transaction | Wait for Commit |
| 405 ~ TARGET SYSTEM FAILS | | | | | |
| | T02 | T02 COMMIT | T02 COMMIT | Unavailable | Unavailable |
| T04 | | T04 Set Transaction | T04 Set Transaction | Unavailable | Unavailable |
| | T01 | T01 COMMIT | T01 COMMIT | Unavailable | Unavailable |
| 410 ~ COMPLETE FILE COPY, RECOVER DBMS, AND EXECUTE THE RECONCILE PROCESS | | | | | |
| T05 | | T05 Set Transaction | T05 Set Transaction | T02 COMMIT | DISCARD |
| T06 | | T06 Set Transaction | T06 Set Transaction | T04 Queue Transaction | Wait for Commit |
| | T3 | T3 COMMIT | T3 COMMIT | T01 COMMIT | DISCARD |
| 415 ~ COMPLETE RECONCILE AND RESTART POSTER | | | | | |
| T07 | | T07 Set Transaction | T07 Set Transaction | T05 Queue Transaction | Wait for Commit |
| | | | | T06 Queue Transaction | Wait for Commit |
| | | | | T3 COMMIT | COMMIT |
| | | | | T07 Queue Transaction | Wait for Commit |

SYSTEM AND METHOD FOR RECONCILING TRANSACTIONS BETWEEN A REPLICATION SYSTEM AND A RECOVERED DATABASE

REFERENCE TO RELATED APPLICATIONS

The present application is a continuation of U.S. patent application Ser. No. 09/782,586, filed Feb. 12, 2001, now U.S. Pat. No. 7,065,538 which claims priority benefit under 35 U.S.C. §119(e) from U.S. Provisional Application No. 60/182,073, filed Feb. 11, 2000, entitled "SYSTEM AND METHOD FOR REPLICATING DATA," each of which is hereby incorporated herein by reference in its entirety.

BACKGROUND OF THE INVENTION

1. Field of the Invention

This invention relates in general to synchronizing two data storage systems during replication, and in particular to reconciling transactions stored in a replication system with transactions already performed on a target database.

2. Description of the Related Art

Replication is often defined as creating and managing two or more versions of some or all of a database. For example, in replication, creation and management often include copying some or all of a source database to one or more target databases, as well as synchronizing the source database with the target databases such that changes made to one are made to the others. Although replication includes a wide number of complexities, replication provides the advantage of, for example, geographically remote users having local copies of a database where each database is updated as if each user were working on a single, centralized database. Such distribution may also allow for load balancing for performance issues related to one or more computer systems or hardware. In addition, replication provides the ability to create mirrors of some or all of a database such that one of the mirrors may be accessed during failure or maintenance. Replication may also provide broadcast or consolidation functions, such as, for example, allowing local copies to synchronize with central copies of a database, or vice versa.

Based on the foregoing, system administrators employ replication in environments where substantially continuous data availability is desired. For example, on-line content providers, on-line retailers, or the like, often desire applications to be available to users substantially every day virtually all of the time. In such applications, many companies feel that downtime for system maintenance or failure recovery equates to business lost because of unavailability, untrustworthiness, or the like.

However, with today's complex and varying computer systems and hardware, substantially constantly available databases under replication are likely to incur at least some unsynchronizing events. For example, one of the source or target databases may need to undergo structural alterations or have an upgrade to the underlying database management system (DBMS). One of the foregoing databases may incur a catastrophic or other failure, or they may be in need of routine maintenance. Regardless of the cause, once an unsynchronizing event occurs, generally the still-available database becomes the source database providing continued access to users or applications, while the unsynchronized database becomes a target database for resynchronization.

Although several solutions exist for resynchronizing the target database with the source database, each carries a variety of drawbacks. For example, some solutions severely limit or entirely discontinue user access to the source database in order to resynchronize the target database. In such systems, a static copy of the source database is generally created, and the source and target databases are then brought back on-line at the same time. The clear drawback of the foregoing static-copy solution is that the source database is substantially unavailable to users or applications during the static copy. As mentioned in the foregoing, such unavailability may lead to counterproductive business consequences.

Another solution for resynchronizing the target database with the source database includes using the backup function of the underlying DBMS. For example, DBMSs, such as those commercially available from Oracle Corporation, often provide a hot backup feature allowing the target database to be recovered to a point in time just before the entire backup process ends. Although the hot backup solution provides an attractive mechanism for recreating the target database, the hot backup solution fails to account for restarting or continuing replication between the source and target databases.

SUMMARY OF THE INVENTION

Therefore, a need exists for a system that resynchronizes a source and target database by restarting replication after the recovery of the target database. In addition, a need exists for a system and method for reconciling transactions between a replication system and a recovered target database. Accordingly, the invention includes a system that resynchronizes a source and target database by restarting replication after the recovery of the target database.

According to one embodiment, the present invention includes a replication system having one or more poster queues. A reconcile process purges transactions from the poster queues which were already posted to a target database during, for example, recovery of the target database. The foregoing already posted transactions are referred to as stale transactions. According to another embodiment, the present invention includes a replication system for restarting a poster process after purging the stale transactions from the poster queue.

Therefore, one aspect of the invention is a device for performing replication between a source system and a target system. The device comprises a source system having data files, and log files storing transactions corresponding to changes made to the data files. The device also comprises a target system, and a replication system performing replication of at least portions of the data files of the source system to the target system by reading the log files and posting the changes from the log files to the target system. The replication system comprises transaction-level poster queues. Each poster queue stores statements corresponding to a particular transaction from the source system. The replication system also comprises a reconcile process which purges transactions from the poster queues when the transactions have already been applied to the target system during recovery of the target system.

Another aspect of the invention is a replication system for replicating at least portions of the data contained in a source database to a target database. The replication system comprises poster queues which store information corresponding to changes made to at least portions of a source system. The replication system also comprises at least one poster process which reads the information stored in the poster queues and generates commands interpretable by a target system and designed to change the target system to reflect the changes made to the at least portions of the source system. The replication system also comprises a reconcile process which purges stale information stored in the poster queues, the stale information corresponding to changes made to the target system during the instantiation or recovery thereof.

Another aspect of the invention is a method of recovering or instantiating a target database during replication from a source database to the target database. The method comprises creating a copy of data from a source database, recovering the copy, and reconciling information contained in a replication system with information stored in the recovered copy, thereby purging stale transactions from the replication system.

Another aspect of the invention is a method of reconciling transactional information stored in a replication system with a recovered database. The method comprises parsing a log file of a recovered database to determine a placement indicator of a recovery flag, and reading transaction data corresponding to changes made to a source database to determine placement indicators of completed transactions. The method also comprises purging the transactional data when the placement indicator corresponding to the completed transaction occurred before the placement indicator of the recovery flag.

Yet another aspect of the invention is a device comprising a source system having a source database management system (SDBMS) which governs the storage of data within the source system and creates a log file tracking changes made to the source system. The device also comprises a target system having a target database management system (TDBMS) which governs the storage of data within the target system and creates a log file tracking the changes made to the target system. The device also comprises a replication system having queues and communicating with the log file of the TDBMS and the log file of the SDBMS, thereby purging from the queues transactions applied after the beginning, but before the completion, of the recovery or instantiation of the target system, wherein the transactions correspond to the changes made to the source system.

For purposes of summarizing the invention, certain aspects, advantages and novel features of the invention have been described herein. It is to be understood that not necessarily all such aspects, advantages or features will be embodied in any particular embodiment of the invention.

BRIEF DESCRIPTION OF THE DRAWINGS

The present invention is described in more detail below in connection with the attached drawings, which are meant to illustrate and not limit the invention, and in which:

FIG. 4 illustrates a simplified transaction progress table highlighting the progress of transactions through the replication environment of FIG. 1, according to aspects of another embodiment of the invention.

DETAILED DESCRIPTION OF THE PREFERRED EMBODIMENTS

According to one embodiment, the invention includes a reconcile process for purging those transactions from a replication system which have already been applied to a target system, thereby ensuring synchronization during, for example, the initialization or recovery of one or more data files of the target database.

To facilitate a complete understanding of the invention, the remainder of the detailed description describes the invention with reference to the figures, wherein like elements are referenced with like numerals throughout.

Figure 1:
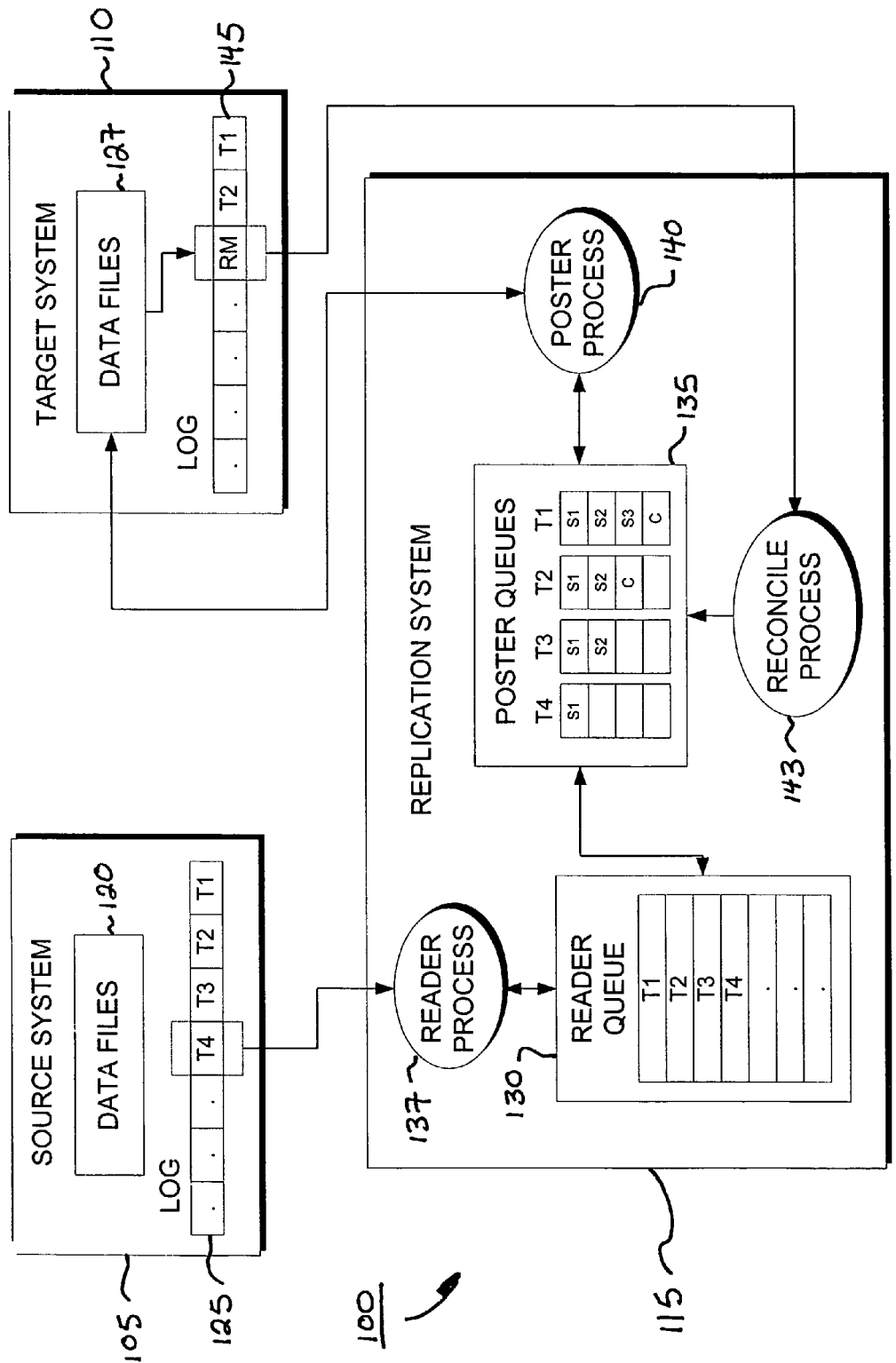
FIG. 1 illustrates a simplified block diagram of a replication environment according to aspects of an embodiment of the invention.

FIG. 1 illustrates a simplified block diagram of a replication environment 100 according aspects of an embodiment of the invention. As shown in FIG. 1, the replication environment comprises a source system 105, a target system 110, and a replication system 115, where the replication system 115 performs replication of data from the source system 105 to the target system 110. According to one embodiment, the source system 105 and the target system 110 organize and store data according to one or more governing database management systems (DBMSs), such as, for example, those commercially available from Oracle Corporation, IBM, or the like. The replication system 115 captures the changes to the source system 105, and forwards those changes to the target system 110, thereby ensuring that data of the source system 105 and the data of the target system 110 are in synchronization with one another.

According to one embodiment, the replication system 115 executes on computer devices or systems foreign to those of the source system 105 or the target system 110. In such an embodiment, communication between the source system 105, the replication system 115, and the target system 110, may advantageously include communication links known to a skilled artisan, such as, for example, the Internet, other public or private computer networks, telephone or cable services, wireless or satellite services, or the like. In addition, a skilled artisan will recognize from the disclosure herein that some or all of the replication system 115 may execute on the computers or computing devices associated with the source system 105, the target system 110, or portions of both. For example, according to one preferred embodiment, a system administrator may advantageously configure the replication environment 100 to optimize the system resources available, such as, for example, the computer devices, the communication links, and the like. Therefore, the skilled artisan will recognize from the disclosure herein that the entire replication environment 100 may reside in whole or in part on one or more computers or computing devices.

Although the function of replication is disclosed with reference to its preferred and alternative embodiments, the invention is not intended to be limited thereby. Rather, a skilled artisan will recognize from the disclosure herein that the replication system 115 may advantageously provide a wide number of services and configurations. For example, the replication system 115 may provide the ability to create mirror systems where some or all of the data of the source system 105 is mirrored on one or more target systems. In addition, the replication system 115 may provide load balancing functions, based on, for example, the hardware and software configurations of the various computing devices or systems. Moreover, the replication system 115 may provide broadcast or consolidation functions, such as, for example, allowing local copies to synchronize with central copies of a database, or vice versa.

FIG. 1 also shows the source system 105 having one or more data files 120 and one or more log files 125. According to one embodiment, the data files 120 include the data of the source system 105, such as, for example, the logical structures containing data, such as tablespaces, tables, indexes, and the like. The data files 120 may also include overhead files for the DBMS, such as system tables, definition, allocation, and analysis information, or the like. According to another embodiment, the log files 125 include a record of the transactions changing the data files 120, such as, for example, redo log files, archive log files, or the like. The foregoing changes may advantageously be stored in a wide number of methods known to a skilled artisan, such as, for example, as the changed data, as the changed data and old data, or the like.

According to one embodiment, control and maintenance of the data files 120, the log files 125, and the changes thereto are governed by the DBMS of the source system 105. For example, according to this embodiment, as users on applications make changes to the data files 120, the DBMS stores records of those changes in the log files 125. As shown in FIG. 1, the log files 125 store, among other things, a record of the transactions changing the data, structure, or the like, of the data files 120. The foregoing transactions are represented in simplified form in FIG. 1 as transaction T1, T2, T3, and the like. A skilled artisan will recognize from the disclosure herein that a transaction often comprises one or more statements, where each statement may change the data or structure of the data files 120. A transaction completes when a user or application connected to the source system 105 issues a completion indicator. According to one embodiment, the completion indicator includes a "COMMIT" statement ordering the DBMS to finalize or complete the statements associated with the transaction.

According to one embodiment, the DBMS may include additional information in the log files 125. For example, the DBMS may include indications as to the time or timing of changes made to the data files 120. For example, according to one embodiment, the DBMS includes placement indicators corresponding to each statement of a transaction. The placement indicator may comprise a wide number of timing or placement mechanisms, such as, for example, a timestamp, a running count, or the like. According to one embodiment, the placement indicator comprises a sequence number of a particular log file along with the displacement within that log file. For example, the placement indicator may advantageously include sequence numbers to at least in part identify a particular log file. A given sequence number may uniquely identify a log file or may be used along with other information to uniquely identify a particular log file. The displacement number may advantageously indicate the displacement, such as, for example, the number of bytes, within the particular log file where certain data was found.

Based on the foregoing, the DBMS may advantageously include in the log files 125, statements from transactions applied against the data files 120 of the source system 105. Moreover, the DBMS may advantageously name or number the log files 125. According to one embodiment, the name or number of a particular log file may be used by the replication system 115 as, for example, at least a portion of a placement indicator. Thus, placement indicators advantageously provide an indication as to the order or timing of the particular statement as compared to at least the statements of a particular log file, and in some cases, as to the statements of all other log files.

The replication system 115 reads the foregoing log files 125 of the source system 105 and applies the changes represented therein to data files 127 of the target system 110. For example, according to one embodiment, the replication system 115 includes a reader queue 130, one or more poster queues 135, one or more reader processes 137, one or more poster processes 140, and a reconcile process 143. According to one embodiment, the reader queue 130 comprises a first-in-first-out (FIFO) queue as is known to a skilled artisan. For example, the FIFO queue may use various pointers in revolving memory locations to indicate where incoming and outgoing data is to be placed. According to another embodiment, the poster queues 135 advantageously comprises multiple FIFO sub-queues, such as, for example, transaction-level queues, where each transaction-level queue collects statements associated with a particular transaction.

According to one embodiment, during replication from the source system 105 to the target system 110, the reader process 137 connects to the log files 125 of the source system 105. According to one embodiment, the reader process 137 executes on the source system 105 and accesses the log files 125 without using the DBMS of the source system 110. However, a skilled artisan will recognize from the disclosure herein that the reader process 137 may advantageously connect as a client to the DBMS of the source system, or to application program interfaces (APIs) provided by, for example, the DBMS provider or other third-parties providing suitable software for the same.

The reader process 137 parses the log files 125 and collects transaction information, such as, for example, the transaction statements indicating the changes made by a user or application to the data files 120. In addition, the reader process 137 may advantageously determine the placement indicators corresponding to the foregoing transaction statements. As shown in FIG. 1, the reader process 127 stores the transaction information, including the placement indicators, in the reader queue 130. As statements relating to particular transactions are collected and stored in the reader queue 130, they are forwarded through, for example, a network connection, to the poster queues 135. According to one embodiment, the poster queues 135 organize the statements into particular transaction-level queues.

The poster process 140 reads the transaction-level queues and determines whether a particular transaction-level queue has received a final or completion indicator associated with that transaction, such as, for example, the foregoing COMMIT statement. When a transaction-level queue includes a completion indicator, the poster process 140 formulates commands, interpretable by the DBMS of the target system 110, which modify data files 127 of the target system 110 according to the statements of the completed transaction. The foregoing commands may advantageously include SQL statements known to a skilled artisan for communicating with and modifying data files governed by a DBMS.

Once the poster process 140 receives acknowledgement that the appropriate changes have been made to the target system 110, the poster process 140 releases the corresponding transaction-level queue of the poster queues 135. The releasing of the transaction-level queue allows the same to begin accepting statements stored in the reader queue 130 corresponding to another transaction.

According to one embodiment, a system administrator may advantageously configure the replication environment 100 such that the reader queue 130 and reader process 137 execute on computing devices or systems corresponding to the source system 105, while the poster queues 135 and poster process 140 execute on computing devices or systems corresponding to the target system 110. In the foregoing configuration, the replication system 115 may use a communication link to communicate transaction data from the reader queue 130 to the poster queues 135. As will be known to a skilled artisan from the disclosure herein, the communication link may use a wide number of requests and acknowledgements over a wide number of public or private networks, wireless devices, or the like to perform the foregoing functionality.

Based on the foregoing, during normal replication, the replication system 115 advantageously employs the reader queue 130, the poster queues 135, the reader processes 137, and the poster processes 140 to ensure that the data files 120 of the source system 105 and the data files 127 of the target system 110 remain in synchronization with one another. In addition, the replication system 115 may advantageously provide other replication functionality, such as those disclosed in the foregoing and including, mirroring, fault and failure protection, broadcast or consolidation, or the like.

FIG. 1 also shows the replication system 115 including the reconcile process 143. According to one embodiment, the reconcile process 143 advantageously purges stale transactions from the replication system 115. For example, as disclosed in the foregoing, even stable, robust DBMSs under replication are prone to unsynchronizing events such that the target system 110 may need to rebuild some or all of the data files 127, some or all of its log files 145, or both. When an unsynchronizing event occurs, at least one of the reader queue 130 and the poster queues 135 will begin stockpiling changes occurring to the still available source system 105 by users or applications thereof. When the target system 110 again becomes available, the reader queue 130 and the poster queues 135 may have transaction data which has already been applied to the target system 110 during the recovery thereof. The foregoing already-applied transactions are referred to as stale transactions. Thus, if foregoing stale transactions were reapplied to the target system 110, the data files 127 of the target system 110 will again become unsynchronized.

To avoid the foregoing application of stale transactions, according to one embodiment, the reconcile process 143 accesses the log files 145 of the target system 110, and determines a recovery position of the target system 110. According to one embodiment, the recovery position indicates the point to which the target system 110 recovered. The reconcile process 143 then accesses the poster queues 135 and purges any completed transactions occurring before the recovery position. For example, according to one embodiment, the DBMS of the target system 110 may advantageously provide a recovery marker (RM) in the log files so as to indicate the recovery position of the target system 110. Accordingly, the reconcile process 143 parses the log files to find the recovery marker and its corresponding placement indicator. Using placement indicator, the reconcile process 143 reads the data found in the transaction-level queues of the poster queues 135 and determines whether a particular transaction-level queue has received a final or completion indicator. When the completion indicator is found in a particular transaction-level queue, the reconcile process 143 compares the placement indicator associated with the transaction to the placement indicator associated with the recovery marker. When the comparison places the completion indicator before the recovery marker, the reconcile process 143 releases the corresponding transaction-level queue, thereby allowing the same to begin accepting statements stored in the reader queue 130 corresponding to another transaction, effectively purging the stale transaction. On the other hand, when the comparison places the completion indicator after the recovery marker, the reconcile process 143 moves to the next transaction-level queue.

Based on the foregoing, the reconcile process 143 advantageously purges the poster queues 135 of stale transactions, thereby allowing for the restarting of replication between the source system 105 and the target system 110. FIG. 1 illustrates a simplified example of the foregoing disclosure. As shown in FIG. 1, the target system 110 recovered to a point after the completion of transactions T1 and T2. Therefore, the DBMS of the target system 110 placed the recovery marker (RM) in the log files 145 of the same. However, during recovery or instantiation of the target system 110, the source system 105 remained available to users or applications, and in this example, received transactions T3 and T4. At least portions of transactions T1-T4 have propagated through the replication system 115 to the poster queues 135. If the poster process 140 were to apply the transaction-level queues corresponding to T1 and T2 to the data files 127 of the target system 110, the target system will again become unsynchronized with the source system 105. For example, according to one embodiment, the data files 127 become corrupted because the completed transactions T1 and T2 had already been reflected in the copying of the data files 120 from the source system 105 to the target system 110, and in the subsequent recovery of the target system 110. Therefore, the reconcile process 143 reads the log files 145 and determines the placement indicator of the recovery marker, compares this placement indicator to placement indicators of the completion indicators ("C") of transactions T1 and T2 in the poster queues 135, and releases those transaction-level poster queues to accept new transactions.

On the other hand, when the reconcile process 143 reads the transaction-level queues associated with transactions T3 and T4, it determines that the completion indicator is not available, and therefore, the reconcile process 143 does not release the queues. Thus, when the completion indicators for transactions T3 and T4 are provided and the poster process 140 is restarted, the poster process 140 advantageously applies transactions T3 and T4 to the data files 127 of the target system 110. Because the source system 105 continued to be available throughout the foregoing example, the foregoing reconciling and restarting of the replication system 115 was unknown to the users or applications of the source system 105. Thus, the foregoing example provides virtually no interruptions in accessibility of the source system 105 from the perspective of the users or applications thereof.

Although the replication process 143 is disclosed with reference to its preferred or alternative embodiments, the invention is not intended to be limited thereby. Rather, a skilled artisan will recognize from the disclosure herein a wide number of alternatives for the configuration of the replication system 115 and the purging of stale transactions by the reconcile process 143. For example, the reader queue 130 and poster queues 135 may advantageously be combined into one large queue, one group of transaction-level queues, or the like. In such embodiments, the reconcile process 143 purges stale transactions from the appropriate stockpiled queue. Also, the recovery marker may advantageously employ other indicators to identify one or more recovery points.

Figure 2:
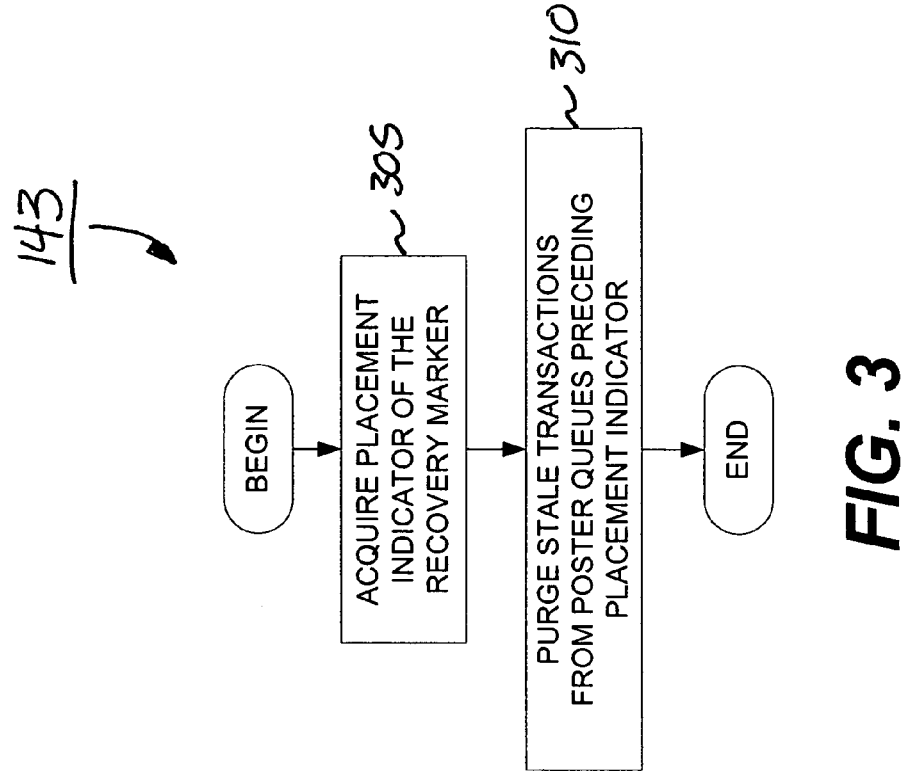
FIG. 2 illustrates a simplified flow chart of a target recovery process according to aspects of another embodiment of the invention.

FIG. 2 illustrates a simplified flow chart of a target recovery process 200 according to aspects of another embodiment of the invention. As will be understood by a skilled artisan from the disclosure herein, the target recovery process 200 may advantageously be employed by a system administrator to recover some or all of an unsynchronized target system 110, create some or all of a new target system 110, or the like. As shown in FIG. 2, the target recovery process 200 begins with Block 205 where the system administrator creates a dynamic copy of some or all of the data files 120 from the source system 105, on the target system 110.

According to one embodiment, the system administrator may advantageously place the DBMS of the source system 105 into hot back mode, thereby allowing for the dynamic copy of the data in the data files 120 and the log files 125 to the target system 110. For example, according to some hot backup modes, a transaction may be applied to a portion of the data files 120 after the creation of the backup has begun. This portion may not yet be copied to the target system 110, such that when it eventually is copied, the modified portion is copied in its changed form. Thus, portions of the source system 105 may advantageously include data updated after the backup to the target system 110 has begun, thereby creating a dynamic copy of some or all of the data files 120 and some or all of the log files 125. Meanwhile, according to one embodiment, the foregoing transaction is recorded by the source system 105 into the log files 125, read by the reader process 137, and stockpiled in the one of the reader queue 130 and poster queues 135. For example, when the poster queues 135 are configured to reside on the target system 110, the poster queues 135 may not yet be available and thus the transactions occurring to the source system 105 are stockpiled in the reader queue 130. However, a different configuration may provide the availability of the poster queues 135 such that the transactions are stockpiled therein.

Once the hot backup completes, the target system 110 includes the data files 127 having some portions which include transaction applied after the copying began, and other portions not including such updates. When the system administrator opens, or mounts the data files 127, the DBMS of the target system 110 recognizes the internal inconsistencies and, in Block 210 of the target recovery process 200, the DBMS recovers those data files 127. A skilled artisan will recognize from the disclosure herein that the recovery process will roll forward those transactions which have received a completion indicator, and roll back those transactions which have not. Rolling transactions forward generally means the statements of a particular transaction are applied to the data files and finalized, while rolling transactions back generally means any statements of a particular transaction which were applied, are undone.

When the DBMS completes recovery of the target system 110, the DBMS advantageously places the recovery marker in the log files 145. Meanwhile, the transactions stockpiling in the reconcile system 115 include those transactions rolled forward along with those transaction statements rolled back. In the embodiment where portions of the replication system 115 reside on each of the source system 105 and target system 110, once communication is restored, the system administrator in Block 215 of the target recovery process 200 reconciles the transactions stored in the replication system 115 with the data files 127 of the target system 110, thereby purging the replication system 115 of any stale transactions. According to one embodiment, the system administrator accomplishes the purging through the execution of the reconcile process 143.

Thereafter, the system administrator in Block 220 restarts the replication between the source system 105 and the target system 110. For example, according to one embodiment, the system administrator restarts the poster process 140. As disclosed in the foregoing, the poster process 140 reads the transaction-level queues, formulates commands interpretable by the target system 110 corresponding to the statements of the completed transaction, updates the data files 127 of the target system 110 according to the completed transaction, and releases the transaction-level queue to collect statements for another transaction.

Thus, the target recovery process 200 advantageously recovers the target system 110, reconciles the replication system 115 with the data files 127 of the target system 110, and restarts the replication of the source system 105 to the target system 110. According to one advantageous embodiment, during the target recovery process 200, users and application have continual access to the data files 120 of the source system 105. Thus, by employing the target recovery process 200, the replication environment 100 advantageously resynchronizes a source and target database by restarting replication after the recovery of the target database.

Figure 3:
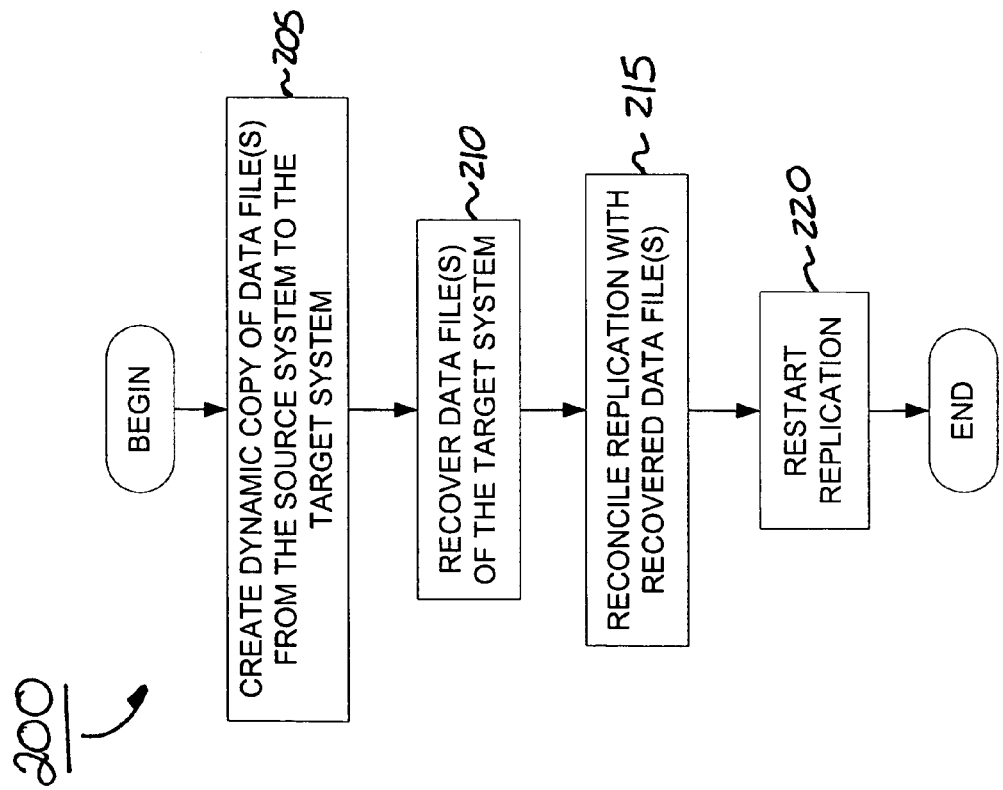
FIG. 3 illustrates a simplified flow chart of the reconcile process of the replication environment of FIG. 1, according to aspects of another embodiment of the invention.

FIG. 3 illustrates a simplified flow chart of the reconcile process 143, according to aspects of another embodiment of the invention. According to FIG. 3, the reconcile process 143, in Block 305, acquires the placement indicator of the recovery marker from the log files 145. As disclosed in the foregoing, the reconcile process 143 searches the log files 145 for the recovery marker and acquires the placement indicator thereof. According to one embodiment, the DBMS places the recovery marker in a new log file as one of the final steps to recovery. Therefore, the reconcile process 143 may advantageously begin searching for the recovery marker near the beginning of the current log file 145.

Also as discussed in the foregoing, as some DBMSs rotate and archive log files, they apply a unique or substantially unique sequence number to the log file. According to one embodiment, the reconcile process 143 records the information, such as the sequence number, which uniquely identifies the log file having the recovery marker. In addition, the reconcile process 143 records the displacement, within the log file to the recovery marker. The displacement may advantageously comprise the number of bytes that exist, for example, in the log file 145 before the recovery marker. Thus, the reconcile process 143 advantageously procures a placement indicator indicating the recovery position of the target system 110. For example, according to one embodiment, the recovery position identifies the position where transactions completed before the placement indicator were applied to the target system 110, and statements of transactions not completed were rolled back. Moreover, because the target system 110 was created from a hot backup of the source system 105, the log files 145 of the target system 110 will advantageously include sequence numbers corresponding, or at least substantially corresponding, to the sequence numbers of the log files 125 of the source system 105. Thus, the placement indicator corresponding to the recovery marker advantageously includes a sequence number that is comparable to sequence numbers of transaction data from the data files 120 of the source system 105.

FIG. 3 also shows that the reconcile process 143, in Block 310, uses the placement indicator to purge stale transactions from the poster queues 135. As discussed in the foregoing, placement indicators for each statement read from the log files 125 is included in the transaction information stored in the poster queues 135. Thus, according to one embodiment, the reconcile process 143 reads each transaction-level queue of the poster queues 135 looking for corresponding completion indicators. When a completion indicator exists, the reconcile process 143 compares the placement indicator with the placement indicator of the recovery marker. When the placement indicator of the completion identifier for the transaction "predates" the placement indicator of the recovery marker, the recovery process 143 knows that particular transaction was applied, or rolled forward, during the recovery of the target system 110. Thus, the reconcile process 143 provides a release for the corresponding transaction-level queue, effectively purging the stale transaction from the replication system 115.

FIG. 4 illustrates a simplified transaction progress table 400 highlighting the progress of exemplary transactions through the replication environment 100, according to aspects of another embodiment of the invention. As shown in FIG. 4, users or applications apply statements from transactions T01-T03 to the source system 105 while the replication system 115 is replicating changes to the source system 105 onto the target system 110. Thus, the DBMS of the source system 105 places copies of the statements from transactions T01-T03 in the log files 125 of the source system 105. The reader process 137 parses the log files 125 and stores copies of the statements and their placement identifiers in the reader queue 130 of the replication system 115. The reader queue 130 forwards the foregoing information to the transaction-level queues of the poster queue 135. The poster process 140 does not apply transactions T01-T03 because they have not yet been finalized in the source system 105.

According to the simplified example of the transaction progress table 400 of FIG. 4, at time 405 the target system 110 fails. According to this embodiment, the system administrator configured the replication system 115 such that during failure, communication between the reader queue 130 and the poster queues 135 is not available, for example, as is likely when the poster queues 135 reside on the target system 110. Sometime after failure, but before the recovery, of the target system 110, users or applications complete transactions T2 and T1, and begin statements for transaction T4.

According to one embodiment, after time 405, the system administrator employs the hot backup feature of the DBMS of the source system 105 to create a new target system 110, and recovers the new target system 110 at time 410. Because communication is reestablished between the source system 105 and the target system 110, the replication system 115 begins moving transaction data stockpiled in the reader queue 130 to the poster queues 135. Thus, as shown in FIG. 4, the completion indicators from transactions T1 and T2, along with statements corresponding to transactions T3 and T4 are stored in, for example, the transaction-level queues of the poster queues 135.

The system administrator also starts or executes, at time 410, the reconcile process 143. The reconcile process 143 parses the log files 145 of the target system 110 and finds the recovery marker placed by the DBMS of the target system 110. The reconcile process 143 reads the transaction-level queue corresponding to transaction T2, and finds the completion indicator associated therewith. The reconcile process 143 compares (1) the placement indicator of the completion indicator corresponding to transaction T2 with (2) the placement indicator corresponding to the recovery marker, and as shown in FIG. 4, determines that the completion indicator arrived before the completion of the recovery process. Therefore, the reconcile process 143 knows that the transaction T2 was applied to the data files 127 during recovery, and therefore, knows they are not to be reapplied here. Accordingly, the reconcile process 143 releases the transaction-level queue corresponding to transaction T2 such that that queue now is ready to accept new transaction data, thereby, effectively purging the poster queues 135 of the stale transaction T2. The reconcile process 143 repeats the foregoing with respect to stale transaction T1.

On the other hand, as shown in FIG. 4, the reconcile process 143 also reads the data of the transaction-level queue corresponding to T3. Because transaction T3 has not yet received a corresponding completion indicator, statements from transaction T3 were rolled back during the recovery of the target system 110. Thus, the reconcile process 143 does not release this transaction-level queue. Similarly, the reconcile process 143 repeats the foregoing with respect to the transaction-level queue corresponding to transaction T4. Once the reconcile process 143 has checked the transaction-level queues of the poster queues 135, the reconcile process 143 ends.

During the foregoing processing, statements from transactions T05 and T06, along with the completion indicator for transaction T03, were applied to the data files 120 of the source system 105. The foregoing transactions had also progressed to the reader queue 130.

According to one embodiment, time 415, the system administrator restarts the poster process 140. The poster process 140 reads the transactions-level queues corresponding to transactions T03-T06, and finds the completion indicator in transaction T03, and according to one embodiment, applies all of the statements of transaction T03, including those rolled back during recovery, to the data files 127 of the target system 110. Thus, the poster process 140 advantageously restarts replication right where the recovery process left off, thereby creating for the users or application of the source system 105, a smooth transition between the failure of the target system 110 and the recovery and eventual restarting of replication to the same.

Although the foregoing invention has been described in terms of certain preferred embodiments, other embodiments will be apparent to those of ordinary skill in the art from the disclosure herein. For example, when the source system 105 fails, the replication system 115 may advantageously switch the target system 110 to be the new source system, and then use the new source system to rebuild and restart replication with the old source system 105, now new target system. In addition, a skilled artisan will recognize from the disclosure herein that the blocks of the target recovery process 200 may advantageously be commands entered into a command window associated with the replication system 115, where the entry of some or all of the commands may be automated. Alternatively, the entire process 200 may advantageously be automated through a program sensing the completion of the various blocks thereof.

Additionally, other combinations, omissions, substitutions and modifications will be apparent to the skilled artisan in view of the disclosure herein. Accordingly, the present invention is not intended to be limited by the reaction of the preferred embodiments, but is to be defined by reference to the appended claims.

What is claimed is:

1. A system for performing replication between a source device and a target device, the system comprising:
    a source database having first data files and log files storing replication transactions corresponding to changes made to the first data files;
    a recovered target database having second data files comprising data associated with at least one replication transaction stored in the log files; and
    a replication device capable of replicating at least a portion of the first data files to the recovered target database by posting to the recovered target database the changes made to the first data files, the replication device comprising:
        at least one poster queue configured to store information indicative of the replication transactions, and
        a reconcile process configured to purge at least one replication transaction from the at least one poster queue when the at least one replication transaction has already been applied to the recovered target database.

2. The system of claim 1, wherein the second data files comprise a rolled back copy of at least a portion of the first data files.

3. The system of claim 2, wherein the replication device is configured to perform the replication transactions by rolling forward at least a portion of information rolled back during recovery of the recovered target database.

4. The system of claim 3, wherein the replication device is further configured to perform the replication transactions such that the at least one replication transaction purged from the at least one poster queue is not applied while rolling forward.

5. The system of claim 1, wherein the source database remains available during recovery of the recovered target database.

6. The system of claim 1, wherein the replication device further comprises at least one poster process configured to read the information stored in the at least one poster queue, the at least one poster process configured to generate commands interpretable by the recovered target database and designed to change the recovered target database to reflect the changes made to the first data files.

7. The system of claim 6, wherein the at least one poster process is configured to read a completion indicator from the at least one poster queue, wherein the completion indicator corresponds to one or more finalized changes made to the source database.

8. The system of claim 7, wherein the completion indicator corresponds to a COMMIT statement.

9. The system of claim 1, wherein the reconcile process employs a plurality of placement indicators to determine which information stored in the poster queues is stale.

10. The system of claim 9, wherein one of the plurality of placement indicators corresponds to a recovery marker placed by the recovered target database, wherein the recovery marker identifies how much of the information the recovered target database already applied during recovery thereof.

11. A method of recovering or instantiating a target database during replication from a source database to the target database, the method comprising:
   logging replication transactions in a replication system, wherein the replication transactions are associated with changes made to a source database;
   applying the replication transactions to a target database to maintain in the target database a copy of the source database;
   recovering the target database by rolling back information applied to the target database such that the recovered target database contains a copy of certain changes represented by the replication transactions contained in the replication system; and
   purging the replication transactions from the replication system that represent the certain changes already applied to the recovered target database.

12. The method of claim 11, additionally comprising restarting replication by rolling forward at least some of the information rolled back during said recovering of the target database such that the purged stale replication transactions are not applied during replication.

13. The method of claim 12, wherein the source database remains available during said recovering, purging, and restarting.

14. The method of claim 13, additionally comprising creating in the target database a copy of the source database by employing a hot backup mode of a database management system of the source database.

15. The method of claim 13, wherein said recovering the target database comprises placing a recovery marker in the recovered copy, thereby identifying a recovery position therein.

16. The method of claim 15, wherein said purging the replication transactions comprises locating the recovery marker and the replication transactions representing certain changes completed on the source system before the placement of the recovery marker.

17. A replication system for reconciling information stored in a replication device with a recovered database, the replication system comprising:
   first means for storing data files and log files, wherein the log files store replication transactions corresponding to changes made to the data files;
   second means for storing a rolled back copy of the data files after recovery of the second means, wherein the rolled back copy of the data files comprises data associated with at least one replication transaction stored in the log files; and
   means for replicating at least a portion of the data files to the second means by posting to the second means the changes made to the data files, the means for replicating comprising:
      means for storing information indicative of the replication transactions, and
      means for purging at least one replication transaction from the means for storing information when the at least one replication transaction has already been applied to the second means.

18. The replication system of claim 17, wherein the means for replicating is configured to perform the replication transactions by rolling forward at least a portion of information rolled back during recovery of the second means.

19. The replication system of claim 18, wherein the means for replicating is further configured to perform the replication transactions such that the at least one replication transaction purged from the means for storing information is not applied while rolling forward.

20. The replication system of claim 17, wherein the first means remains available during recovery of the second means.

* * * * *